5/24/77 XR 4,025,682

United States Patent [19]

Cieciuch et al.

[11] 4,025,682

[45] May 24, 1977

[54] PHOTOGRAPHIC PRODUCTS

[75] Inventors: Ronald F. W. Cieciuch, Newton; Herbert N. Schlein, Beverly, both of Mass.

[73] Assignee: Polaroid Corporation, Cambridge, Mass.

[22] Filed: Aug. 7, 1975

[21] Appl. No.: 602,665

Related U.S. Application Data

[60] Division of Ser. No. 300,277, Oct. 24, 1972, Pat. No. 3,923,519, which is a continuation-in-part of Ser. No. 214,600, Jan. 3, 1972, abandoned.

[52] U.S. Cl. .................................... 428/480; 96/3; 96/29 D; 96/84 UV; 428/408; 428/913; 428/918; 428/244

[51] Int. Cl.² ..................... G03C 1/84; G03C 5/54; B32B 27/36

[58] Field of Search .......... 428/913, 918, 408, 407, 428/244, 480, 482, 483; 96/3, 77, 84 UV, 29 D, 84 R, 76 R

[56] References Cited

UNITED STATES PATENTS

| | | | |
|---|---|---|---|
| 2,770,534 | 11/1956 | Marx | 428/913 X |
| 3,340,062 | 9/1967 | Hunter et al. | 96/84 R |
| 3,351,470 | 11/1967 | McCune | 96/29 D |
| 3,364,022 | 1/1968 | Barr | 96/3 |
| 3,429,732 | 2/1969 | Baitinger | 428/913 X |
| 3,460,942 | 8/1969 | Rogers | 96/3 X |
| 3,702,245 | 11/1972 | Simon et al. | 96/3 |

*Primary Examiner*—Harold Ansher
*Attorney, Agent, or Firm*—John P. Morley

[57] ABSTRACT

Integral negative-positive patterns viewable without separation of the negative-positive components. Essential elements of such film units comprise a photosensitive system which after exposure and processing can provide a diffusion transfer image pattern, an image pattern receiving system and a reflection system integrated with the elements of the product so that after exposure and processing, the image pattern can be viewed as a reflection print. The image receiving system of the products of the present invention comprise a transparent support or dimensionally stable layer through which the image pattern can be viewed and the transparent support or layer is characterized in that a distinctive UV light absorption capability is integrated therewith. In the especially preferred products, the transparent layer or support additionally comprises a finely divided pigment dispersed therein which provides an effective anti-light piping capability without impairing to any substantial degree the transparency of the support or layer.

4 Claims, 2 Drawing Figures

PHOTOGRAPHIC PRODUCTS

CROSS-REFERENCE TO RELATED PATENT APPLICATIONS

This application is a division of U.S. Application Ser. No. 300,277 filed Oct. 24, 1972 now U.S. Pat. No. 3,923,519 and which in turn is a continuation-in-part of U.S. Patent Application Ser. No. 214,600 filed Jan. 3, 1972 and now abandoned.

BACKGROUND OF THE INVENTION

1. The Field of the Invention

This invention relates to photographic products. More precisely, the invention disclosed herein relates to integral negative positive diffusion transfer photographic products.

2. Description of the Prior Art

Integral negative-positive diffusion transfer photographic products which can provide image patterns viewable by reflection are known to the art. Photographic products of this type are described in more detail, for example, in U.S. Pat. Nos. 3,415,644; 3,415,645; 3,415,646; 3,473,925; 3,573,042; 3,573,043; 3,573,044; 3,576,625; 3,576,626; 3,578,540; 3,579,333; 3,594,164; 3,594,165 all of which are expressly incorporated herein by reference. Essential elements of such photographic products comprise a photosensitive system which after exposure and processing can provide a diffusion transfer image pattern, an image receiving system for receiving the diffusion transfer image pattern and a reflecting system integrated with the elements of the product so that after exposure and processing, the image pattern can be viewed as a reflection print. Film products of the type to which the present invention pertains may also contain other layers capable of providing specific desired functions. Such layers can include, for example, spacer layers, barrier layers, neutralizing layers etc. More often than not, a rupturable container retaining a processing composition is integrated with the above mentioned members and layers of such photographic products so that the processing composition can be applied to the exposed photosensitive system by the application of compressive force to the container.

In photographic products of the type described above, multicolor images are obtained by employing a film unit containing at least two selectively sensitized silver halide layers each having associated therewith a dye image-providing material exhibiting desired spectral absorption characteristics. The most commonly employed elements of this type are the so-called tripack structures employing a blue-, a green- and a red-sensitive silver halide layer having associated therewith, respectively, a yellow, a magenta and a cyan dye image-providing material.

The dye image-providing materials which may be employed in such processes generally may be characterized as either (1) initially soluble or diffusible in the processing composition but are selectively rendered non-diffusible in an imagewise pattern as a function of development; or (2) initially insoluble or non-diffusible in the processing composition but which are selectively rendered diffusible in an imagewise pattern as a function of development. These materials may be complete dyes or dye intermediates, e.g., color couplers.

As examples of initially soluble or diffusible materials and their application in color diffusion transfer, mention may be made of those disclosed, for example, in U.S. Pat. Nos. 2,647,049; 2,661,293; 2,698,244; 2,698,798; 2,802,735; 2,774,668; and 2,983,606. As examples of initially non-diffusible materials and their use in color transfer systems, mention may be made of the materials and systems disclosed in U.S. Pat. Nos. 3,443,939; 3,443,940; 3,227,550; 3,227,551; 3,227,552; 3,227,554; 3,243,294; and 3,445,228.

The image receiving system of products of the present invention essentially comprise a receiving layer for receiving a diffusion transfer image pattern after exposure of the photosensitive system and appropriate processing of the exposed system. Further the image receiving system comprises a substantially transparent layer or support member integrated with the receiving layer so that the image pattern obtained in the receiving layer can be viewed through the transparent layer or support.

The film units of the present invention also comprise as an essential element, a reflecting system which is arranged or can be arranged between the receiving system and the exposed photosensitive system so that the reflective system can provide the requisite background for viewing the image pattern obtained in the image receiving layer. In one embodiment of the products embraced within the scope of the present invention, the reflecting system comprises an opaque dimensionally stable layer positioned between the photosensitive system and the image receiving system. In such products the opaque layer is an integral part of the product prior to exposure thereof and provides a reflective background for viewing the image pattern obtained in the receiving system after exposure of the photosensitive system and processing thereof. In still another embodiment of the products of the present invention, the reflective system is not present as an integral layer of the product prior to exposure but is provided after exposure such as by distributing a reflecting agent between the image receiving system and the photosensitive system after exposure thereof. In both embodiments mentioned above, the reflecting system preferably is further characterized in that it additionally provides effective masking of the exposed photosensitive system as well as a suitable background for viewing by reflection the image pattern obtained in the image receiving system. Additional details relating to the reflecting systems of the products of the present invention including the ingredients of such systems and the manners in which such systems can be integrated with integral negative-positive film products can be found in commonly assigned U.S. Patent Application Serial No. 43,782 filed June 5. 1970 and now abandoned; Ser. No. 101,968 filed Dec. 28, 1970 and now U.S. Pat. No. 3,647,437; Ser. No. 846,441 filed July 31, 1965 and now U.S. Pat. No. 3,615,421; Ser. No. 3,645, filed Jan. 19, 1970 and now U.S. Pat. No. 3,620,724 and Ser. Nos. 43,741 and 43,742 both filed June 5, 1970 and now U.S. Pat. Nos. 3,647,434 and 3,647,435 respectively.

In general the integral negative-positive film units of the present invention may be exposed to form a developable image which is developed thereafter by applying an appropriate processing composition to develop exposed silver halide and to form, as a function of development, an imagewise distribution of diffusible dye image-providing material which is then transferred to the dyeable stratum to impart thereto the desired color transfer image. As has been mentioned before, common to all of these systems is the provision of a reflecting system between the image receiving system and the photosensitive system to effectively mask the latter and to provide a background for viewing the color image imparted to the image receiving layer of the image receiving system so that this image may be viewed, by reflecting light, without separation from the other layers or elements of the film unit.

Particularly preferred integral negative-positive film units of the present invention are those described in the aforementioned U.S. Pat. No. 3,415,644 and which comprise a composite structure having a photosensitive system containing in order, a dimensionally stable alkali solution impermeable opaque layer, a layer containing a cyan dye developer, a redsensitive silver halide emulsion layer, a layer containing a magenta dye developer, a green-sensitive silver halide emulsion layer, a layer of yellow dye devleoper, a blue-sensitive silver halide emulsion layer. The image receiving system of such products includes, in order, a dyeable stratum, a spacer layer, a neutralizing layer and a dimensionally stable alkali solution impermeable transparent layer with the dyeable stratum being positioned adjacent the blue sensitive silver halide layer of the photosensitive system. The composite structure is employed in combination with a rupturable container retaining an aqueous alkaline processing composition including a reflection system comprising a white reflecting agent. The container is integrated with the composite structure so that the container's contents can be distributed between the dyeable stratum and the bluesensitive silver halide emulsion layer upon application of compressive pressure.

Especially preferred film units of the type described in U.S. Pat. No. 3,415,644 are those wherein the image receiving system of the composite structure includes a dimensionally stable alkali solution impermeable transparent layer which comprises a distinctive anit-light piping capability. These especially preferred film units are described in more detail in commonly assigned U.S. Pat. Application Ser. No. 194,407 filed Nov. 1, 1971 by Edwin H. Land now abandoned in favor of application Ser. No. 419,808 filed Nov. 28, 1973. In that application a peculiar potential fogging problem encountered in integral negative-positive, diffusion transfer film units is described. Essentially, the fogging problem is caused by a phenomenon somewhat similar to "light piping" and can arise as the film unit is drawn from the camera between opposed rollers to distribute the processing composition-which includes a reflection system-between the image receiving system and the exposed photosensitive system. When the reflection system is completely distributed between the image receiving system and the photosensitive system it can provide protection for all portions of the exposed photosensitive system from activating radiation passing through the transparent layer of the image receiving system. However, until the reflection system is completely distributed between the image receiving system and the photosensitive system and all portions of the photosensitive system are so protected, there is a potential of some radiation passing through the transparent layer to the reflective system and then being reflected, scattered or otherwise transmitted to the unprotected portions of the photosensitive system. In other words, in film units of the type described in U.S. Pat. No. 3,415,644 there is a finite increment of time required to completely distribute the reflection system between the image receiving and photosensitive systems. During the time necessary to achieve complete distribution, radiation can be transmitted to unprotected portions of the photosensitive system to cause unwanted fogging. In accordance with the invention disclosed in U.S. Patent Application Serial No. 194,407 mentioned before, this unwanted fogging can be virtually eliminated by including a minor amount of a pigment in at least one of the layers comprising the image receiving system and preferably in the transparent layer of the system. The minor amount of pigment is sufficient to effectively prevent the potential fogging but is insufficient to affect the overall transparency of the layer through which the image pattern is viewed.

When integral negative-positive diffusion transfer film units of the types described are exposed to light for extended periods as when left on a table face up, the color reflection print has been observed to evidence in time a "stain" or discoloration which is considered to be caused by photolysis, e.g., a decomposition or chemical action effected by the action of light. This problem is most pronounced in those systems employing a reflection system of the type disclosed in the aforementioned applications Ser. Nos. 43,782 and 101,968 which includes a reflective agent and an optical filter agent which is rendered colorless after development by reduction of the environmental pH. The staining or instability of the image pattern is also believed to be caused, at least in part, by photolysis of silver in some form which has diffused from the negative component to the positive component.

SUMMARY OF THE INVENTION

The present invention is based on the discovery that the above discussed staining and its adverse effects on image quality and/or stability can be effectively overcome by including a UV absorber of a particular class in the transparent layer or member of the image receiving system. Special advantages are obtained by the inclusion of the particular UV absorber(s) in the transparent layer especially when the transparent layer comprises a pigment which provides an anti-light piping capability for the layer. For example, it has been found that specialized considerations had to be given to the selection of the particular UV absorber to be employed in order to overcome the above discussed staining problems in integral positive-negative diffusion transfer photographic products of the type described before. Chief among these considerations are the potential instability of the UV absorber in the presence of the processing fluid. Another special consideration arises in those products wherein the transparent layer contains a finely divided carbon black providing an anti-light piping capability and this consideration relates to the effect of the UV absorber on the desired degree of transparency of the layer so that viewing of the image pattern therethrough is not adversally affected. The particular UV absorber included in the transparent support of products of the present invention have been found to be remarkably compatable with the processing compositions involved and also do not adversally affect or otherwise impair the transparency of those layers comprising a carbon black pigment which provides an anti-light piping capability. Another advantage obtained in the use of the UV absorber containing supports of the present invention involves the elimination of specialized filters when photosensitive systems are exposed through the support. As those skilled in the art know, such specialized filters are oftentimes employed to reduce haze and/or to protect UV sensitive elements of photographic products such as blue sensitized silver halide emulsion layers which are inherently sensitive to UV. Such filters need not be employed when photographic products employ the UV absorber containing supports of the present invention.

The UV absorbers employed in the support layers of the present invention are those that can provide layers that are substantially transparent, i.e., substantially colorless and can provide an optical density of 1 or greater at least across the major portions of the region between about 300 to about 375 mμ. The term optical density means the density measured as transmission density at the wavelength of maximum absorption and the terminology, "the major portion of the region between about 300 to about 375 mμ" means that a measurement at substantially all of the individual wavelengths would provide a density of at least about 1 although some wavelengths may provide lower densities. Most preferred are those UV absorbers that provide an optical density greater than about 2 at least across the region between about 325 to about 360 mμ.

A preferred class of UV absorbers employed in the practice of the present invention are certain 2-aryl-4,5 arylo-1,2,3-triazole compounds of the formula:

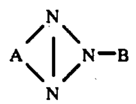

where:

A represents a phenylene radical bound by two neighboring carbon atoms to two nitrogen atoms of the triazole ring, and B represents a phenyl radical, substituted by groups not imparting strong coloration.

Details relating to UV absorbers of the above formula can be found in U.S. Pat. Nos. 3,004,896 and 3,189,615; both patents are expressly incorporated herein in their entirety by reference.

DESCRIPTION OF THE PREFERRED EMBODIMENT

In the preferred embodiment the film unit is of the type described in the aforementioned U.S. Pat. No. 3,415,644 and shown in the illustrative drawing and the processing composition employed to develop the film unit will be one of the type mentioned previously including a white pigment reflecting agent and at least one optical filter agent.

As was heretofore mentioned, the novel film units contemplated by this invention include a photosensitive system, an image receiving system and a reflection system as means for providing a reflecting layer between the photosensitive and image receiving systems so that a transfer image formed in the image receiving system may be viewed, without separation, as a reflection print. The essence of the invention of the present application resides in the inclusion of a UV absorber having the heretofore described properties in the transparent support of the image receiving system. The UV absorber may be conveniently included in the transparent support simply by dispersing it with the ingredients employed to prepare this support, e.g., by casting.

Figure 1:
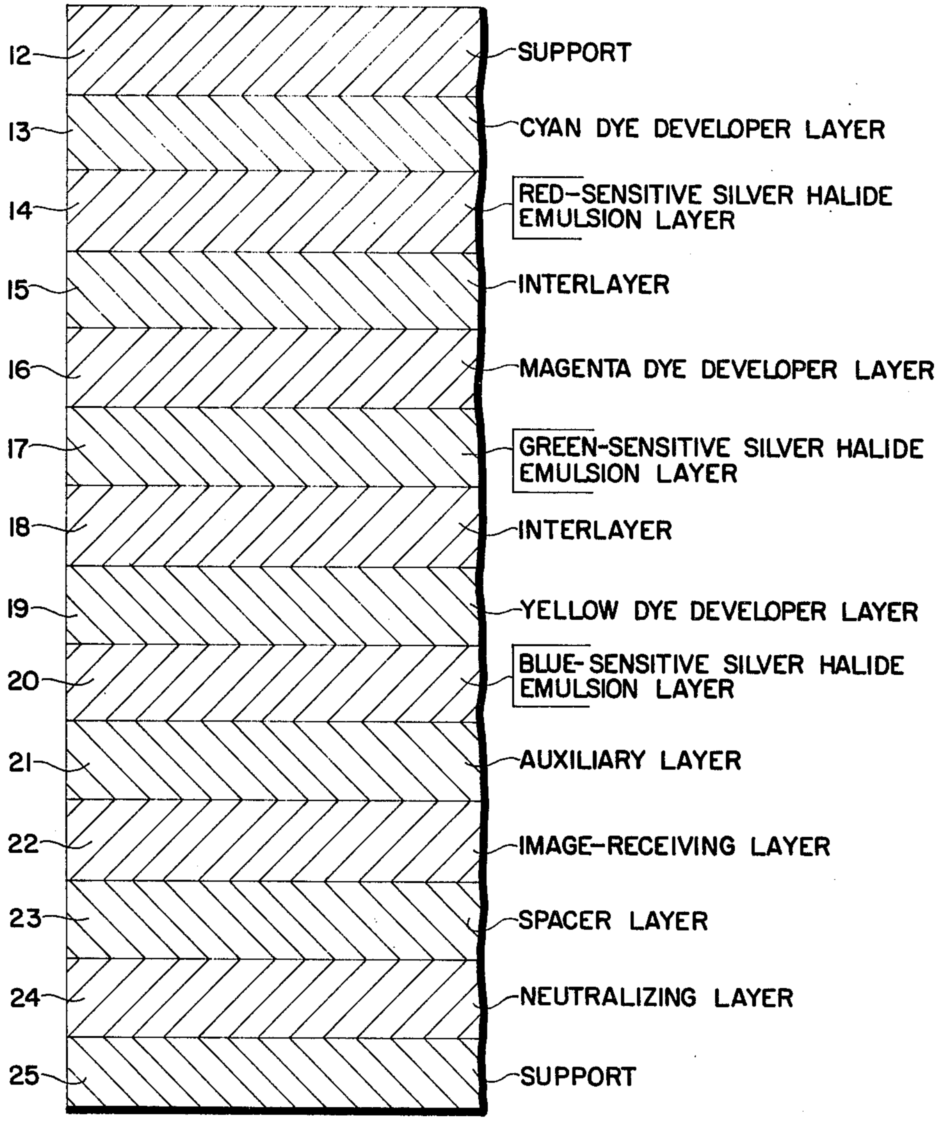
FIG. 1 illustrates a cross-sectional view of a photographic film unit of the present invention.

The present invention may best be illustrated by reference to FIG. 1 which illustrates a typical film unit of the type to which this invention is directed.

As shown in the drawing, such a film unit may comprise, a layer 13 of cyan dye developer, red-sensitive silver halide emulsion layer 14, interlayer 15, a layer of magenta dye developer 16, green-sensitive silver halide emulsion layer 17, interlayer 18, yellow dye developer layer 19, blue-sensitive silver halide emulsion layer 20, auxiliary layer 21, image receiving layer or dyeable stratum 22, spacer layer 23, and a pH-reducing or neutralizing layer 24. Layers 13-21 comprise the photosensitive system and layers 22–24 comprise the image receiving system. These layers are shown to be confined between a dimensionally stable layer or support member 12 which is preferably opaque so as to permit development in the light and dimensionally stable layer or support member 25 which is transparent to permit viewing of a color transfer image formed as a function of development in receiving layer or dyeable stratum 22.

Layers 12 and 25 are preferably dimensionally stable liquid-impermeable layers which when taken together may possess a processing composition solvent vapor permeability sufficient to effect, after substantial transfer image formation and prior to any substantial environmental image degradation to which the resulting image may be prone, osmotic transpiration of processing composition solvent in a quantity effective to decrease the solvent from a first concentration at which the color-providing material is diffusible to a second concentration at which it is not. Although these layers may possess a vapor transmission rate of 1 or less gms./24 hrs./100 in.$^2$/mil., they preferably possess a vapor transmission rate for the processing composition solvent averaging not less than about 100 gms./24 hrs./100 in.$^2$/mil., most preferably in terms of the preferred solvent, water, a vapor transmission rate averaging in excess of about 300 gms. of water/24 hrs./100 in.$^2$/mil., and may advantageously comprise a microporous polymeric film possessing a pore distribution which does not unduly interfere with the dimensional stability of the layers or, where required, the optical characteristics of such layers. As examples of useful materials of this nature, mention may be made of those having the aforementioned characteristics and which are polymers derived from ethylene glycol and terephthalic acid; vinyl chloride polymers; polyvinyl acetate; cellulose derivatives, etc. An especially preferred polymeric material is "Mylar". As heretofore noted layer 12 is of sufficient opacity to prevent fogging from occuring by light passing therethrough, and layer 25 is transparent to permit photoexposure and for viewing of a transfer image formed on receiving layer 23.

The silver halide layers preferably comprise photosensitive silver halide, e.g., silver chloride, bromide or iodide or mixed silver halides such as silver iodobromide or chloriodobromide dispersed in a suitable colloidal binder such as gelatin and such layers may typically be on the order of 0.6 to 6 microns in thickness. It will be appreciated that the silver halide layers may and in fact generally do contain other adjuncts, e.g., chemical sensitizers such as are disclosed in U.S. Pat.

Nos. 1,574,944; 1,623,499; 2,410,689; 2,597,856; 2,597,915; 2,487,850; 2,518,698; 2,521,926; etc.; as well as other additives performing specific desired functions, e.g., coating aids, hardeners, viscosity-increasing agents, stabilizers, preservatives, ultraviolet absorbers and/or speed-increasing compounds. While the preferred binder for the silver halide is gelatin, others such as albumin, casein, zein, resins such as cellulose derivatives, polyacrylamides, vinyl polymers, etc., may replace the gelatin in whole or in part.

The respective dye developers, which may be any of those heretofore known in the art and disclosed for example in U.S. Pat. No. 2,983,606, etc., are preferably dispersed in an aqueous alkaline permeable polymeric binder, e.g., gelatin as a layer from about 1 to 7 microns in thickness.

Interlayers 15, 18 and 21 may comprise an alkaline permeable polymeric material such as gelatin and may be on the order of from about 1 to 5 microns in thickness. As examples of other materials for forming these interlayers, mention may be made of those disclosed in U.S. Pat. No. 3,421,892 and the copending applications of Richard J. Haberlin, Ser. No. 854,491, filed Sept. 2, 1969, and Lloyd D. Taylor, Ser. No. 790,648, filed Jan. 13, 1969, etc. These interlayers may also contain additional reagents performing specific functions and the various ingredients necessary for development may also be contained initially in such layers in lieu of being present initially in the processing composition, in which event the desired developing composition is obtained by contacting such layers with the solvent for forming the processing composition, which solvent may include the other necessary ingredients dissolved therein.

The image-receiving layer may be on the order of 0.25 to 0.4 mil. in thickness. Typical materials heretofore employed for this layer include dyeable polymers such as nylon, e.g., N-methoxymethyl poly-hexamethylene adipamide; partially hydrolyzed polyvinyl acetate; polyvinyl alcohol with or without plasticizers; cellulose acetate with filler as, for example, one-half cellulose acetate and one-half oleic acid; gelatin; polyvinyl alcohol or gelatin containing a dye mordant such as poly-4-vinylpyridine, etc. Such receiving layers may, if desired, contain suitable mordants, e.g., any of the conventional mordant materials for acid dyes such as those disclosed, for example, in the aforementioned U.S. Pat. No. 3,227,550; as well as other additives such as ultraviolet absorbers, pH-reducing substances, etc. It may also contain specific reagents performing desired functions, e.g., a development restrainer, as disclosed, for example, in U.S. Pat. No. 3,265,498.

The spacer or timing layer may be on the order of 0.1 to 0.7 mil. thick. Materials heretofore used for this purpose include polymers which exhibit inverse temperature-dependent permeability to alkali, e.g., as disclosed in U.S. Pat. No. 3,445,686. Materials previously employed for this layer include polyvinyl alcohol, cyanoethylated polyvinyl alcohol, hydroxypropyl polyvinyl alcohol, polyvinyl methyl ether, polyethylene oxide, polyvinyl oxazolidinone, hydroxypropyl methyl cellulose, partial acetals of polyvinyl alcohol such as partial polyvinyl butyral and partial polyvinyl propional, polyvinyl amides such as polyacrylamide, etc.

The neutralizing layer may be on the order of 0.3 to 1.5 mil. in thickness. Materials used heretofore in the preparation of this layer include the polymeric acids disclosed in U.S. Pat. No. 3,362,819, e.g., dibasic acid half-ester derivatives of cellulose, which derivatives contain free carboxyl groups, e.g., cellulose acetate hydrogen phthalate, cellulose acetate hydrogen glutarate, cellulose acetate hydrogen succinate, ethyl cellulose hydrogen succinate, ethyl cellulose acetate hydrogen succinate, cellulose acetate hydrogen succinate hydrogen phthalate; ether and ester derivatives or cellulose modified with sulfoanhydrides, e.g., with ortho-sulfobenzoic anhydride; polystyrene sulfonic acid; carboxymethyl cellulose; polyvinyl hydrogen phthalate; polyvinyl acetate hydrogen phthalate; polyacrylic acid; acetals of polyvinyl alcohol with carboxy or sulfo substituted aldehydes, e.g., o-, m-, or p-benzaldehyde sulfonic acid or carboxylic acid; partial esters of ethylene/maleic anhydride copolymers; partial esters of methyl-vinyl ether maleic anhydride copolymers; etc.

As is disclosed, for example, in the aforementioned U.S. Pat. No. 3,415,644, the film unit shown in the drawing may be developed by applying an aqueous alkaline processing composition including a reflection system which comprises a reflecting agent, e.g., titanium dioxide, between stratum 22 and layer 21 to form a color transfer image viewable through support 25, without separation, as a color reflection print. The resulting print when exposed to light for extended periods has been observed in time to manifest a tendency for a "staining" or "browning" which has been determined to be caused by photolysis induced by actinic light in the UV range of the spectrum. This problem is most noticeable under circumstances described with greater particularity in the aforementioned U.S. Pat. No. 3,647,437 which are highly colored at an alkaline pH so as to permit development of the film unit in the light but which are "cleared" or rendered transparent subsequent to development by lowering the pH so that they do not interfere with the viewing of the resulting image.

Tests have also shown that something in the photosensitive system, i.e., something migrating of diffusing from the photosensitive system to the image receiving system also contributes to this staining as a result of photolysis. While not wishing to be limited to any particular theory as to the latter, it is believed that this substance in the photosensitive system may be some form of silver, e.g., a soluble silver complex which has diffused during or after development to the reflecting layer and/or through it to the image receiving system where the relatively high energy of UV light causes a decomposition or chemical reaction, possibly the production of metallic silver which will appear yellow or brown because of its fine particle size.

In accordance with this invention, this problem can be effectively overcome by incorporating a UV absorber of the foregoing description in the transparent layer of the image receiving system, e.g., in layer 25.

It is to be noted that not any UV absorber can be employed in the practice of this invention; and the UV absorber so employed must be selected from those which possess the optical density characteristics heretofore described at the concentrations employed while at the same time being substantially visibly colorless above about 400 m$\mu$ so as not to detract from the image viewed through the UV-containing layer. Moreover, since many UV absorbers become colored, e.g., yellow, upon contact with alkali, where the UV absorber comes into contact with alkali from the processing fluid it should not be one so affected so as to detract from the visual quality of the image. In other words, apart from its function in minimizing the staining caused by photolysis, the UV absorber should appear visibly colorless at least after completion of image formation so as not to create a different problem while obviating the problem caused by photolysis.

As mentioned, the preferred UV absorbers employed in the practice of the present invention are certain 2-aryl-4,5 arylo-1,2,3, triazole compounds of the formula

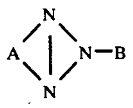

where:

A represents a phenylene radical bound by two neighboring carbon atoms to two nitrogen atoms of the triazole ring and, B represents a phenyl radical, substituted by groups not imparting strong coloration.

Preferred UV absorbers are the "Tinuvin" UV absorbers (trademark of Ciba-Geigy Corp. for a class of benzotriazole UV absorbers understood to have the following general formula:

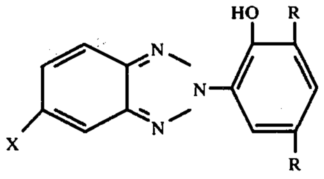

where X = H, Cl and R = alkyl or hydrogen.)

A preferred absorber is "Tinuvin 327," understood to be 2-(3',5'-di-t-butyl-2'-hydroxyphenyl)-5-chlorobenzotriazole. Other "Tinuvin" absorbers such as "Tinuvin 328" may be employed, as well as other absorbers meeting the above-noted qualifications.

The amount of UV absorber employed will vary from system to system, as one skilled in the art will well understand, and the precise amounts of a given absorber needed in the particular film unit to be protected will be likewise readily ascertained by those skilled in the art. By way of illustration, "Tinuvin 328" at a coverage on the order of 50 to 75 mgs./ft.$^2$ has been found to be effective.

In the especially preferred film units of the present invention, the transparent layer includes a UV absorber of the above described characteristics and a pigment which can provide a distinctive anti-light piping capability. As mentioned before, a potential fogging problem can be encountered in photographic products of the type described in U.S. Pat. No. 3,415,644. Essentially the problem arises by reason of the fact that a finite increment of time is required in order to completely distribute the reflection system between the exposed photosensitive system and the image receiving system. During this increment of time, light passing through the transparent layer of the image receiving system can be transmitted edgewise to the portions of the exposed photosensitive system which remain unprotected by the reflection system. In accordance with the invention described and claimed in commonly assigned U.S. Patent Application Ser. No. 194,407 filed Nov. 1, 1971 by Edwin H. Land, this potential fogging problem which is a byproduct of such light piping, can be virtually eliminated by including a minor amount of a pigment in a layer of the image receiving system. Colored pigments are especially preferred and in the preferred embodiment, the pigment is a finely divided carbon black which is included in the transparent layer for the image receiving layer. Moreover, the amount of carbon black included in the layer is sufficient to provide an effective anti-light piping capability but yet insufficient to adversally affect the transparency of the layer. In general the amount of pigment employed in the transparent layer is sufficient to provide an optical density, as measured edgewise at 700 m$\mu$ over a path lenght of 1 inch of at least about 5. The amount of pigment providing an effective anti-light piping capability further being insufficient to prevent transmission of substantially all of the light incident on the surface of the transparent layer so as not to interfere with exposure through the layer or viewing of the image therethrough.

Figure 2:
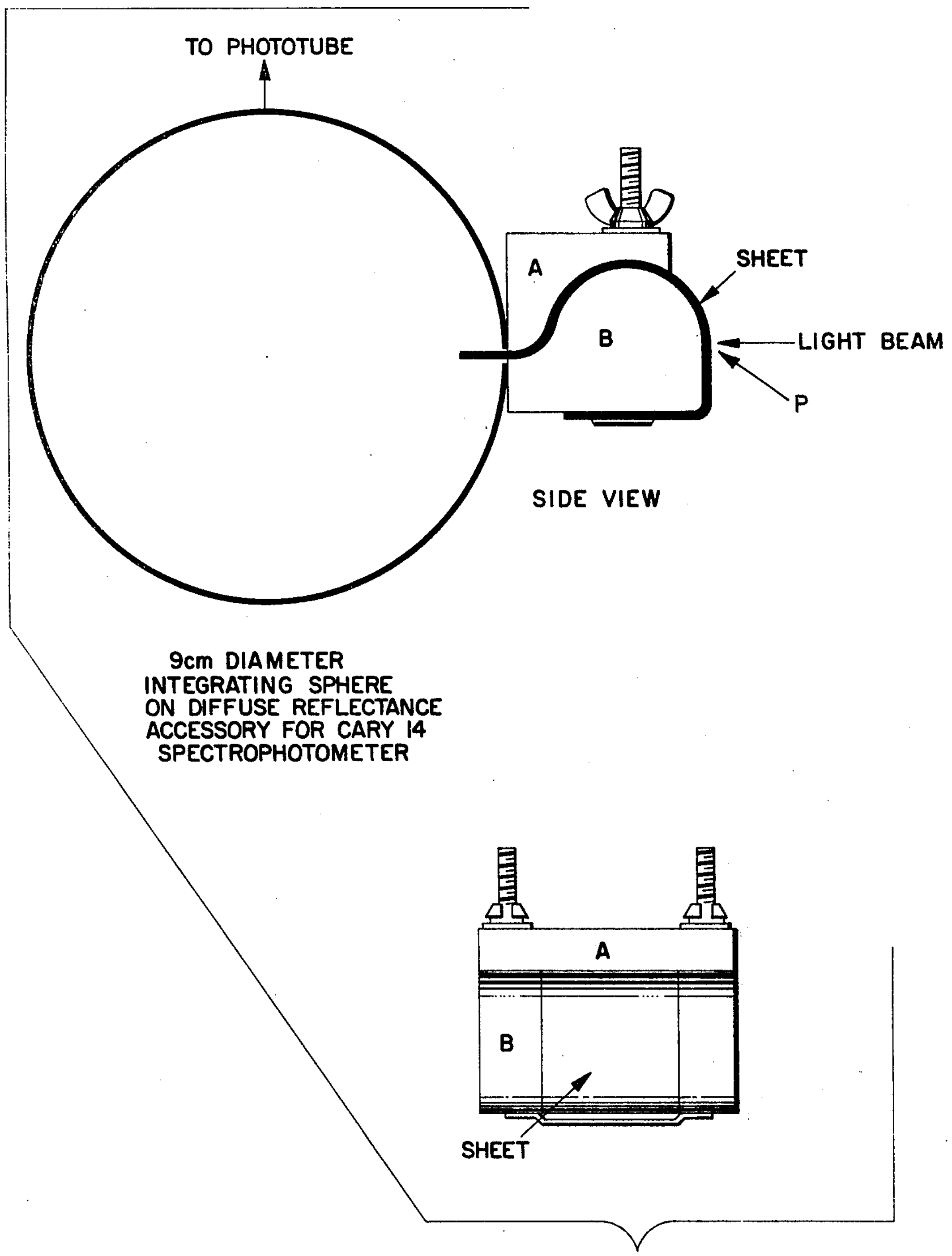
FIG. 2 illustrates means for measuring the light piping optical density of support layers of the present invention.

A simple method for measuring or determining the anti-light piping capability, e.g., optical density, of transparent layers is described below taken in connection with FIG. 2.

PROCEDURE FOR MEASURING ANTI-LIGHT-PIPING OPTICAL DENSITY

1. The sample sheet to be measured is cut to measure 1 inch ×4 inch.
2. It is inserted in the black wooden block between parts (A) and (B) (See FIG. 2), such that ¼ inch protrudes at the exit slit, which will be placed up against the integrating sphere. The long end of the sample is wrapped around the semicyclindrical surface tightly, and the end taped securely to the flat side of the (B) block.
3. The wing nuts are tightened.
4. The Cary 14 is zeroed to 700 nm (m$\mu$) with nothing in the light path.
5. The block is inserted into the light path of the Cary (as shown in the figure) so that the ¼ inch end of the sample sheet protrudes directly into the integrating sphere. The light beam then strikes the sample perpendicularly at point P.
6. The optical density is measured at 700 nm, using filters as necessary to mask the reference beam in order to measure the densities which are greater than the normal maximum density scale (2''.4).

Accordingly in the especially preferred products of the present invention, the transparent layer of the image receiving system includes a UV absorber as well as a pigment which can provide the anti-light piping capability described in the above-mentioned U.S. Patent Application Ser. No. 194,407.

By way of further illustrating the practice of this invention as applied to a film unit of the type shown in the drawing, a gelatin subbed, 4 mil. opaque polyethylene terephthalate film base may be coated with the following layers:

1. a layer of cyan dye developer dispersed in gelatin and coated at a coverage of about 100 mgs./ft.$^2$ of dye and about 80 mgs./ft.$^2$ of gelatin;

2. a red-sensitive gelatino silver iodobromide emulsion coated at a coverage of about 140 mgs./ft.$^2$ of silver and about 70 mgs./ft.$^2$ of gelatin;

3. a layer of a 60-30-4-6 copolymer of butylacrylate, diacetone acrylamide, styrene and methacrylic acid and polyacrylamide coated at a coverage of about 150 mgs./ft.$^2$ of the copolymer and about 5 mgs./ft.$^2$ of polyacrylamide;

4. a layer of magenta dye developer dispersed in gelatin and coated at a coverage of about 100 mgs./ft.$^2$ of dye and about 100 mgs./ft.$^2$ of gelatin;

5. a green-sensitive gelatino silver iodobromide emulsion coated at a coverage of about 100 mgs./ft.$^2$ of silver and about 50 mgs./ft.$^2$ of gelatin;

6. a layer containing the copolymer referred to above in layer 3 and polyacrylamide coated at a coverage of about 100 mgs./ft.$^2$ of copolymer and about 12 mgs./ft.$^2$ of polyacrylamide;

7. a layer of yellow dye developer dispersed in gelatin and coated at a coverage of about 70 mgs./ft.$^2$ of dye and about 56 mgs./ft.$^2$ of gelatin;

8. a blue-sensitive gelatino silver iodobromide emulsion layer including the auxiliary developer 4'-methylphenyl hydroquinone coated at a coverage of about 120 mgs./ft.$^2$ of silver, about 60 mgs./ft.$^2$ of gelatin and about 30 mgs./ft.$^2$ of auxiliary developer; and 9. a layer of gelatin coated at a coverage of about 50 mgs./ft.$^2$ of gelatin.

The three dye developers employed above may be the following:

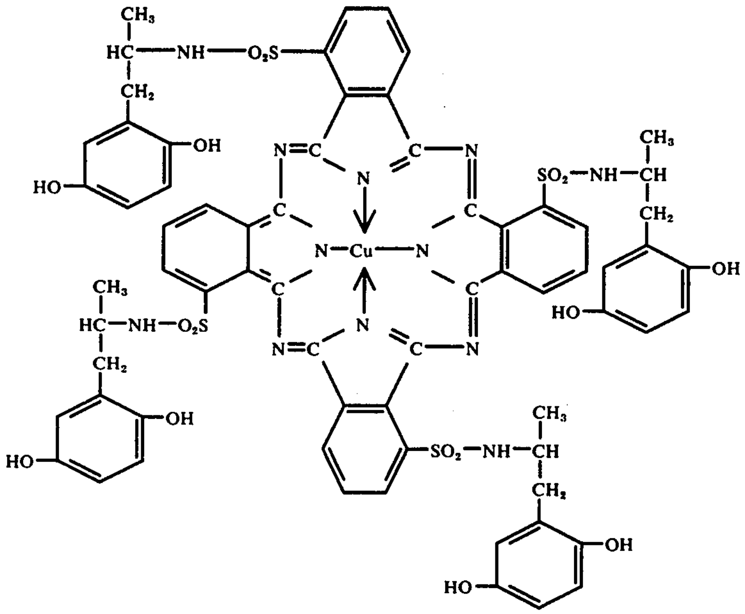

a cyan dye developer;

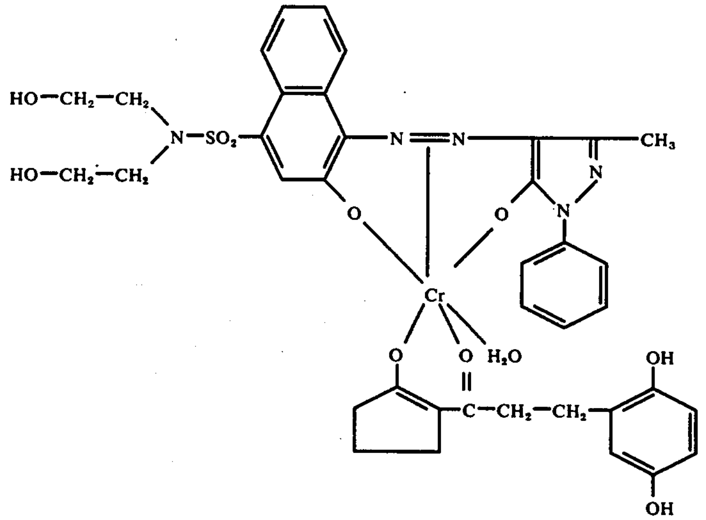

a magenta dye developer; and

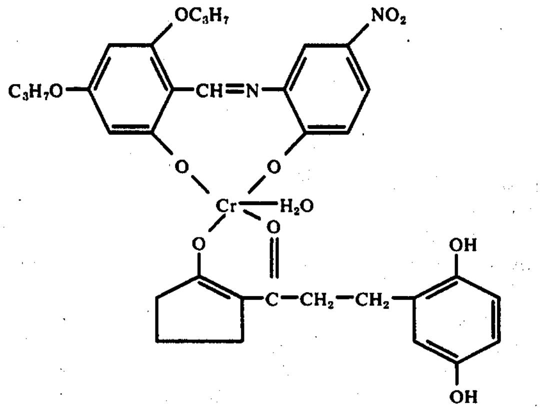

a yellow dye developer.

Then a transparent 4 mil. polyester film base containing a finely divided carbon black dispersed therein in an amount sufficient to provide an optical density as measured on the side of at least about 5 and Tinuvin 328 in an amount sufficient to provide about 50 mgs./ft.$^2$ of Tinuvin 328 may be coated, in succession, with the following illustrative layers:

1. the partial butyl ester of polyethylene/maleic anhydride copolymer at a coverage of about 2,400 mgs./ft.$^2$ of polymer to provide a neutralizing layer.
2. a graft copolymer of acrylamide and diacetone acrylamide on a polyvinyl alcohol backbone in a molar ratio of 1:3.2:1 at a coverage of about 700 mgs./ft.$^2$, to provide a polymeric spacer or timing layer; and
3. a 2:1 mixture, by weight, of polyvinyl alcohol and poly-4-vinylpyridine, at a coverage of about 400 mgs./ft.$^2$ to provide a polymeric image-receiving layer containing development restrainer.

The two components may then be laminated together to provide the desired integral film unit.

A rupturable container comprising an outer layer of lead foil and an inner liner or layer of polyvinyl chloride retaining an aqueous alkaline processing solution may then be fixedly mounted on the leading edge of each of the laminates, by pressure-sensitive tapes, interconnecting the respective container and laminates so that, upon application of compressive pressure to the container to rupture the container's marginal seal, its contents may be distributed between the dyeable stratum (layer 22 of the positive component) and the gelatin layer (layer 21) of the negative component.

An illustrative processing composition to be employed in the rupturable container may comprise the following properties of ingredients:

| | |
|---|---|
| Water | 100 cc. |
| Potassium hydroxide | 11.2 gms. |
| Hydroxyethyl cellulose (high viscosity) [commercially available from Hercules Powder Co., Wilmington, Delaware, under the trade name Natrasol 250] | 3.4 gms. |
| N-phenethyl-α-picolinium bromide | 2.7 gms. |
| Benzotriazole | 1.15 gms. |
| Titanium dioxide | 50.0 gms. |
| (A) | 2.08 gms. |

-continued

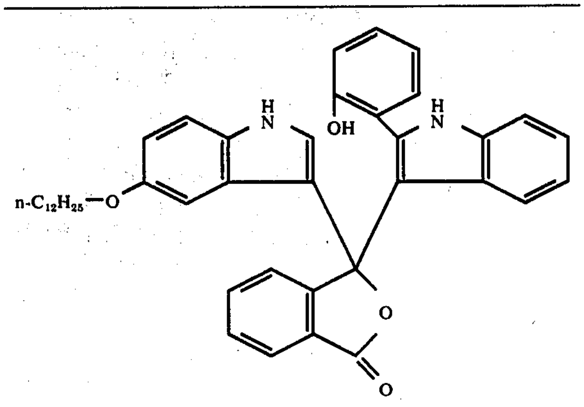

(B) 0.52 gms.

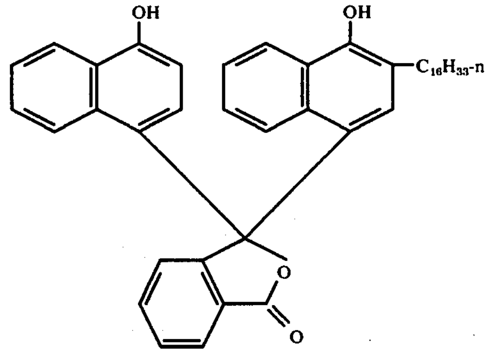

(C) 1.18 gms.

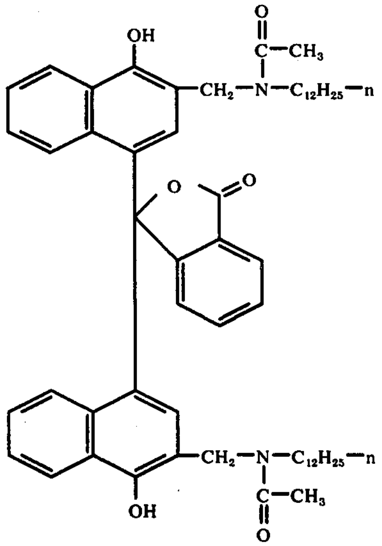

This film unit may then be exposed in known manner to form a developable image and the thus exposed element may then be developed by applying compressive pressure to the rupturable container in order to distribute the aqueous alkaline processing composition, thereby forming a multicolor transfer image which is viewable through the transparent polyethylene terephthalate film base as a positive reflection print.

Since certain changes may be made in the above product and process without departing from the scope of the invention herein involved, it is intended that all matter contained in the above description shall be interpreted as illustrative and not in a limiting sense.

What is claimed is:

1. A substantially transparent, plastomeric support for diffusion transfer photographic film units, said support comprising a plastomeric sheet material having dispersed therein a pigment in an amount insufficient to prevent substantially all light incident on said support from being transmitted therethrough but sufficient to provide an optical density for the support of at least about 5 as measured edgewise at 700 mμ over a path length of one inch and additionally having dispersed therein a 2-aryl-4,5 arylo-1,2,3 triazole UV absorver which is substantially transparent to visible light said triazole being present in an amount providing an optical transmission density of at least 1 between the region from about 300 to about 375 mμ and where said traizole conforms to the following formula:

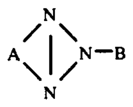

where:

A represents a phenylene radical bounded by two neighboring carbon atoms to two nitrogen atoms of the triazole ring and, B represents a phenyl radical which can be substituted by groups not imparting strong coloration.

2. A support of claim 1 where said 2-aryl-4,5 arylo-1,2,3 triazole conforms to the formula:

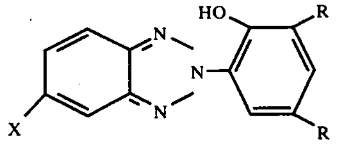

where X is hydrogen or chlorine and each R is alkyl or hydrogen.

3. A support of claim 1 wherein said pigment is a particulate carbon.

4. A substantially transparent, plastomeric support for diffusion transfer photographic film units comprising a polyester sheet material having dispersed therein: a) an amount of a particulate carbon black insufficient to prevent substantially all light incident on said support from being transmitted therethrough but sufficient to provide an optical density for the support of at least about 5 as measured edgewise at 700 mμ over a path length of 1 inch, and b) a substantially transparent 2-aryl-4,5 arylo-1,2,3 triazole UV absorber of the formula:

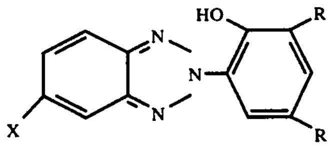

where X is hydrogen or chlorine and R is alkyl or hydrogen.

* * * * *